United States Patent
Donnick, Jr. et al.

(10) Patent No.: US 6,817,476 B2
(45) Date of Patent: Nov. 16, 2004

(54) WATER CLARIFICATION SYSTEM

(75) Inventors: Thomas A. Donnick, Jr., Palm City, FL (US); Robert E. Brayton, Pittsburgh, PA (US)

(73) Assignee: Aerex Industries, Inc., Fort Pierce, FL (US)

( * ) Notice: Subject to any disclaimer, the term of this patent is extended or adjusted under 35 U.S.C. 154(b) by 89 days.

(21) Appl. No.: 10/355,882

(22) Filed: Jan. 31, 2003

(65) Prior Publication Data

US 2004/0149648 A1 Aug. 5, 2004

(51) Int. Cl.$^7$ ............................................... B01D 12/00
(52) U.S. Cl. ...................... 210/522; 210/540; 210/541
(58) Field of Search ................................ 210/521, 522, 210/540, 541, 542

(56) References Cited

U.S. PATENT DOCUMENTS

| | | | |
|---|---|---|---|
| 3,666,111 A | | 5/1972 | Pielkenrood et al. |
| 3,886,064 A | | 5/1975 | Kosonen |
| 4,089,782 A | * | 5/1978 | Huebner ...................... 210/522 |
| 4,120,796 A | | 10/1978 | Huebner |
| 4,184,955 A | * | 1/1980 | Arvanitakis ................ 210/540 |
| 4,346,005 A | | 8/1982 | Zimmerman |
| 4,388,190 A | | 6/1983 | Haddock |
| 4,448,689 A | | 5/1984 | von Nordenskjöld |
| 4,597,869 A | | 7/1986 | Hakansson |
| 4,889,624 A | | 12/1989 | Soriente et al. |
| 4,933,524 A | * | 6/1990 | Meurer ........................ 210/521 |
| 5,028,333 A | | 7/1991 | Wright et al. |
| 5,049,278 A | | 9/1991 | Galper |
| 5,173,195 A | | 12/1992 | Wright et al. |
| 5,547,569 A | | 8/1996 | Spencer |
| 5,770,078 A | * | 6/1998 | Hedrick ...................... 210/522 |
| 6,056,128 A | | 5/2000 | Glasgow |
| 6,245,243 B1 | | 6/2001 | Meurer |

FOREIGN PATENT DOCUMENTS

| | | | |
|---|---|---|---|
| DE | 3924521 A1 | | 1/1991 |
| DE | 4103349 A1 | | 8/1992 |
| DE | 4302003 A1 | | 8/1994 |

OTHER PUBLICATIONS

Parkson Corporation, "Gewe® Inclined Plate Clarifier," www.parkson.com/NEWPROD_gewe_inclined_plate_clarifier_htm. Oct. 30, 2002, 2 pages.

Parkson Corporation, Copy of a Pamphlet Describing Gewe® System, 4 pages.

* cited by examiner

Primary Examiner—Christopher Upton
(74) Attorney, Agent, or Firm—Akerman Senterfitt; Michael K. Dixon; L. Rodman Steele, Jr.

(57) ABSTRACT

A water clarification system for removing suspended solids from a fluid, such as sewage, using gravity. The water clarification system may include a plurality of settling plates releasably coupled to a housing. The housing positions the settling plates at acute angles relative to a substantially horizontal line using a plurality of guides. The settling plates are kept in position using one or more flanges that are releasably coupled to side walls of the housing. The water clarification system operates by receiving a fluid through an inlet orifice located near bottom sections of the plurality of settling plates. The fluid travels in the spaces between adjacent settling plates and through apertures in top flanges of the settling plates. The fluid collects in an exit channel that is formed by the top flanges of the settling plates.

27 Claims, 4 Drawing Sheets

WATER CLARIFICATION SYSTEM

FIELD OF THE INVENTION

The invention is directed generally to wastewater treatment systems, and more particularly, to water clarification systems using gravity.

BACKGROUND

Water treatment and wastewater treatment often includes numerous steps performed by different components depending on the contaminants to be removed. Many treatment systems include one or more systems for removing suspended solids from a fluid. One such system for removing solids is a water clarification system. Conventional water clarification systems remove suspended solids from a fluid using gravity by pumping the fluid into the bottom of a tank. The fluid fills the tank and passes over a weir located at the top of the tank. While the fluid remains in the tank, the fluid is not subjected to mechanical agitation and the suspended solids are allowed to settle out of the fluid. The solids collect at the bottom of the tank and the fluid having few suspended solids flow over a weir, through an exit channel, and into another system.

One particular water clarification system, as shown in FIG. 1, includes a plurality of plates that are generally parallel, spaced about 2 inches apart, and positioned at angles relative to a bottom floor. The plates are positioned in the system using guides attached to the side walls of the system. Water enters the system through an inlet flume near the bottom of the settling plates and passes into the space between the plates. Water flows upwardly through the space between adjacent settling plates. Suspended solids settle out of the water, collect on top surfaces of the plates, and flow down the surface of the plates, eventually falling to the bottom of the tank. Clarified water flows out of the top opening of the settling plates, over a weir and into an outlet trough.

This system is typically assembled on-site, and the tank is typically made of concrete. After the tank is formed, the plate support structure is assembled and the settling plates are installed. While this system performs adequately, it is costly to erect and difficult to assemble so that leakage does not occur around the settling plates thus bypassing the clarifier system. Water clarifier systems often require occasional routine cleaning and maintenance of the settling plates, which can be difficult and expensive.

Thus, an efficient, inexpensive, and easily maintainable water clarification system is needed.

SUMMARY OF THE INVENTION

This invention is directed to a water clarification system for removing suspended solids from liquids using gravity. The water clarification system is one component of a conventional water treatment system that may include various additional treatment steps. The water clarification system of this invention includes a housing that may have a plurality of side walls and end walls. A frame may support the side walls, end walls, and other components of the water clarification system. The water clarification system also includes a plurality of inclined settling plates. The settling plates direct the water to be clarified from an inlet distribution orifice, which may be located near the bottom of the settling plates, to an exit channel formed by top flanges of the settling plates. The settling plates are formed from a body and a top flange. The top flanges are substantially horizontal and, when several are assembled in the water clarification system, form a substantially smooth, horizontal exit channel. Each top flange contains at least one aperture for allowing clarified water to pass from the spaces between the settling plates to the exit channel.

The settling plates may be positioned in the water clarification system using a plurality of guides coupled to the side walls of the housing. In one embodiment, these guides are angle brackets attached to the side walls and may extend the entire length of the plates. Each plate may be supported by two guides, one on either side. The guides substantially seal the plates to the side walls, thereby preventing a significant amount of liquids from bypassing the inclined plates and passing through the system without clarification. In addition, the plates may be made narrower than the distance between the side walls to enable ease of installation and removal during assembly and routine cleaning and maintenance of the system.

A top flange of the settling plates may also include a sealing member for sealing adjacent plates together. In one embodiment, the sealing member is attached to the top flange. The sealing member may be angled relative to the top flange and positioned generally parallel to the body of the settling plate so that the top flange forms a seal between adjacent settling plates. The sealing member prevents liquid from leaving the space between the settling plates and entering the exit channel without first passing through the apertures in the top flange. A stiffening section, which may be substantially vertical when placed in the system, may be included in the bottom section of a settling plate to stiffen the plates.

The water clarification system may also include one or more flanges for keeping the settling plates in position. In one embodiment, the flanges may be angle brackets that may have a length sufficient to seal the edges of the flanges on the settling plates to the side walls. The flanges may be releasably coupled to the side walls for easy removal. The substantially horizontal top flanges on the settling plates enable the settling plates to be sealed to the side walls.

In one embodiment, the top flanges of the plates are made of a material having sufficient strength and shape to support the weight of maintenance personnel during routine cleaning and repair of the system.

An object of this invention is to provide a water clarification system having settling plates that are easy to be removed individually during routine maintenance.

Another object of this invention is to provide a water clarification system having settling plates that provide a support surface capable of safely supporting personnel during routine maintenance.

An advantage of this water clarification system is that the horizontal top flanges, when assembled in the system, create a smooth exit channel for the clarified liquid, eliminating the need for a separate channel.

Another advantage of this water clarification system is that the apertures located in the horizontal top flanges provide adjustable, uniform liquid flow distribution across the plurality of settling plates, thus eliminating the need for additional outlet flow distribution devices such as weirs or flumes.

Yet another advantage of this invention is that the side guides and top sealing flanges provide an effective seal to prevent liquid from bypassing the settling plates and passing through the system without first being clarified.

These and other features and advantages of the present invention will become apparent after review of the following drawings and detailed description of the disclosed embodiments.

BRIEF DESCRIPTION OF THE DRAWINGS

The accompanying drawings, which are incorporated in and form a part of the specification, illustrate preferred embodiments of the presently disclosed invention(s) and, together with the description, disclose the principles of the invention(s). These several illustrative figures include the following.

DETAILED DESCRIPTION OF THE INVENTION

Figure 3:
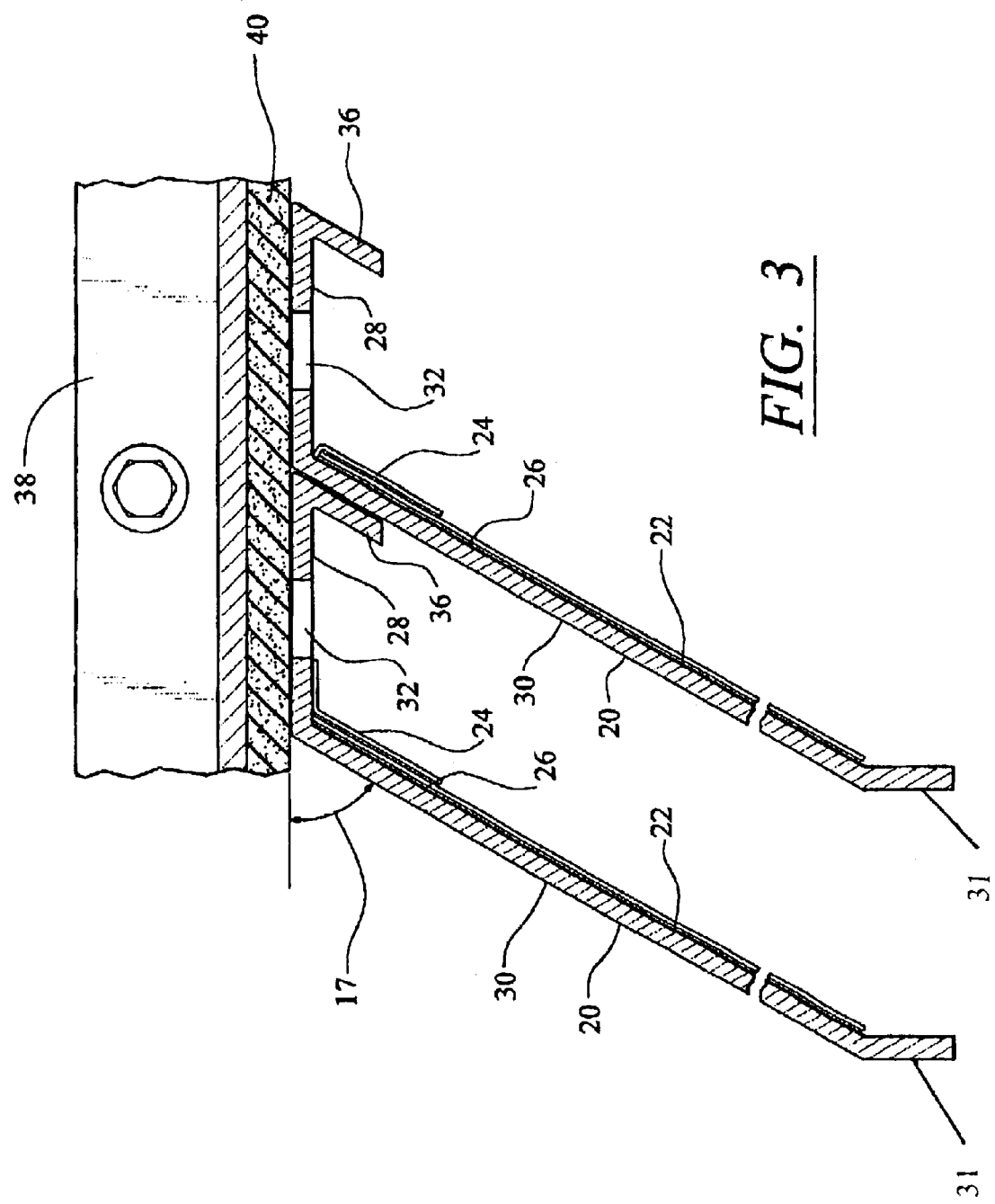
FIG. 3 is a cross-section of two plates positioned in the water clarification system of FIG. 2.

This invention is a water clarification system 10, as shown in FIG. 3, for removing suspended solids from a fluid using gravity separation principles. Water clarification system 10 is designed to removed suspended solids from sewage. However, water clarification system 10 is not limited to removal of solids from sewage. Rather, water clarification system 10 may remove suspended solids from other fluids as well.

Figure 1:
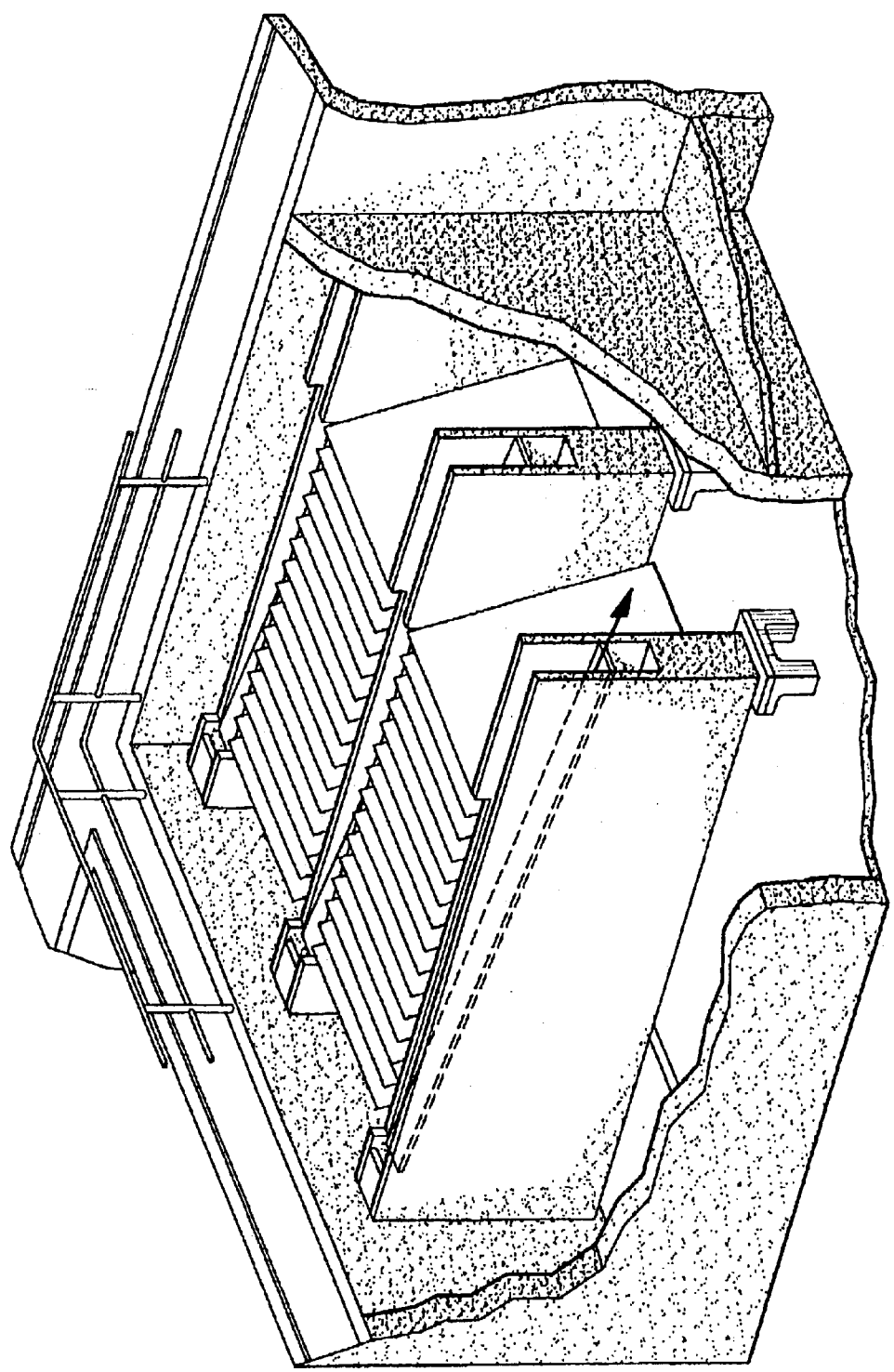
FIG. 1 is a schematic perspective illustration of a partial cutaway of a conventional water clarification system.
Figure 2:
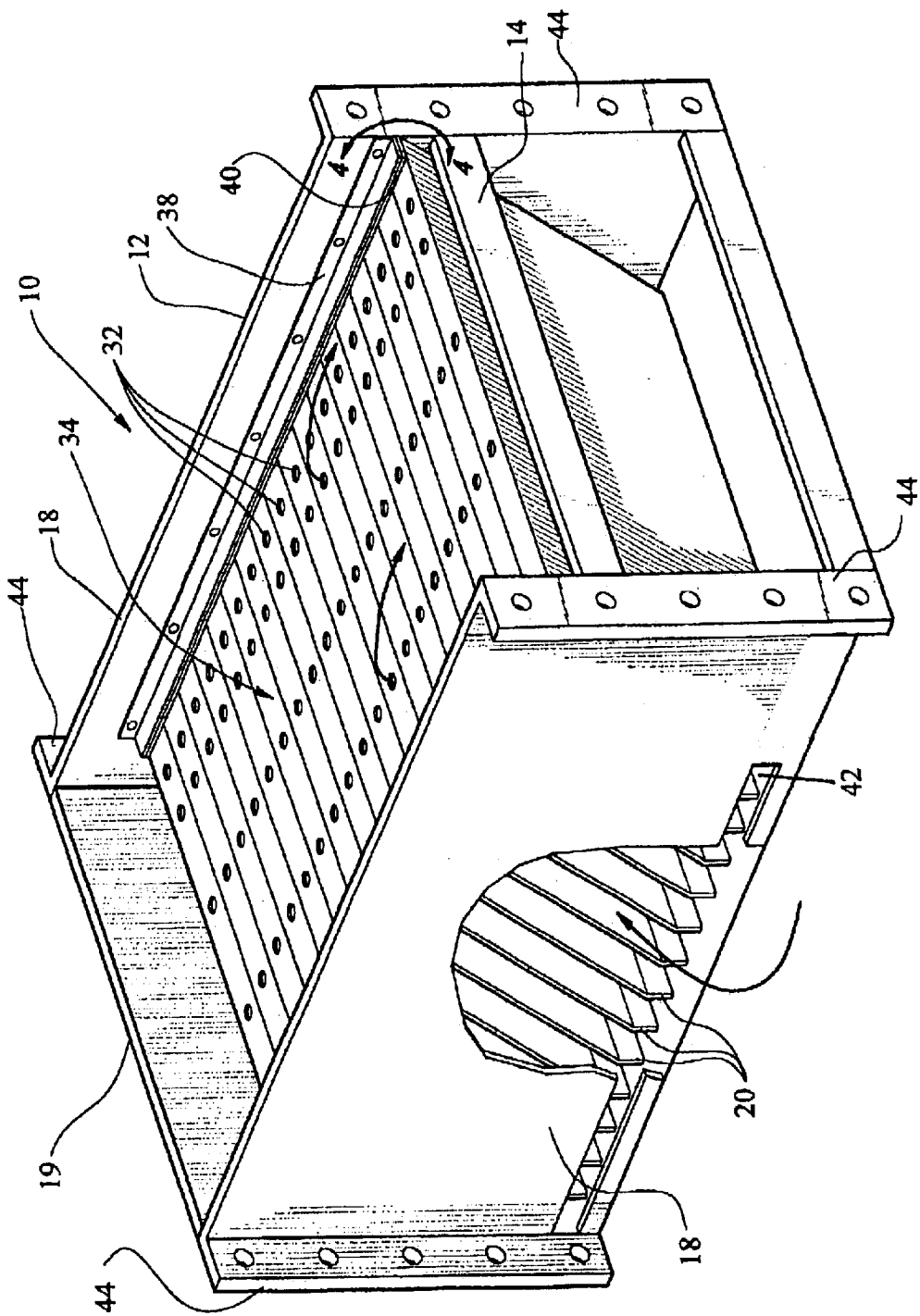
FIG. 2 is a perspective view of a water clarification system of this invention with an end wall removed and a partial cutaway in a side wall.

As shown in FIG. 2, water clarification system 10 includes a housing 12 supported by frame 14. Frame 14 is not limited to any particular configuration. Rather, frame 14 may be formed in any configuration that adequately supports housing 12 and other components of water clarification system 10. Housing 12 may be a tank for containing a fluid. Alternatively, housing 12 may be configured to be placed in a tank or other structure capable of containing a fluid. In one embodiment, housing 12 is a box-like structure having a plurality of side walls 18, and end walls 19. Housing 12 may or may not have end wall structures. Side walls 18 may be formed from any resilient material and are preferably formed from a non-corrosive material, such as, but not limited to, stainless steel, plastics, and the like. In another embodiment, housing 12 may include a bottom structure having a solids removal apparatus.

Water clarification system 10 includes a plurality of settling plates 20 positioned throughout housing 12. In one embodiment, settling plates 20 are positioned generally parallel to each other and positioned at an acute angle relative to a substantially horizontal line. The acute angle may be between 30 and 70 degrees and preferably between 45 degrees and 55 degrees relative to a substantially horizontal line. Settling plates 18 are held in this position with a plurality of guides 22. Guides 22 may be attached to side walls 18 or to frame 14 using any conventional attachment method such as, but not limited to, welded joints, bolts or other conventional attachment devices. In one embodiment, guides 22 may be angled brackets that are attached to side walls 18 or frame 14 at a desired angle relative to a horizontal line. Guides 22 may be attached to each side wall 18 to support each settling plate 20 on each side of the settling plates 20. In another embodiment, guides 22 may be posts, protrusions, or other such component. Guides 22 have sufficient strength to support settling plate 20.

Each settling plate 20 may include an attachment clip 24 for securing settling plates 20 in housing 12. Attachment clip 24 is not limited to one particular embodiment. For instance, as shown in FIG. 3, attachment clip 24 may be mounted to an underside 26 of settling plate 20. In this embodiment, settling plate 20 includes two attachment clips 24. A first attachment clip 24 is mounted on a first side of the settling plate 20 and a second attachment clip 24 is mounted to a second side of settling plate 20 that is generally opposite from the first side. Attachment clip 24 is configured to receive guide 22. Attachment clip 24 may be coupled to settling plate 20 using any convention connection device or method, such as, but not limited to, welding, such as spot welding, screws, bolts, and other such devices.

In another embodiment, attachment clip 24, as shown in FIG. 3, is attached to a top flange 28 of settling plate 20. Attachment clip 24 is configured differently than the embodiment described above but performs the same function. Attachment clip 24 is configured to contact guide 22 by positioning guide 22 between attachment clip 24 and the underside 26 of settling plate 20.

Each settling plate 20 is formed from a top flange 28 and a body 30. Settling plate 20 is a thin sheet of material, which may be composed of, but is not limited to, stainless steel, plastic or other non-corrosive, resilient material. In one embodiment, top flange 28 may be integrally formed by bending a portion of body 30 to form top flange 28. In another embodiment, top flange 28 may be coupled to body 30 by welding the components together or other mechanisms.

When settling plates 20 are installed in housing 12, top flange 28 contacts an adjacent settling plate 20 and may form a watertight seal. In this configuration, top flange 28 of settling plates 20 form a bottom surface of an exit channel 34. The bottom surface formed by the settling plates may be smooth and flat. Exit channel 34 is defined by side walls 18 and top flanges 28.

Settling plate 20 may include a stiffening section 31 for stiffening the settling plate. Stiffening section 31 may be located at the bottom portion of settling plate 20. Stiffening section 31 may be integrally formed with body 30 or may be coupled to body 30. Stiffening section 31 may be positioned relative to body 30 so that section 31 is at an acute angle relative to body 30. Stiffening section 31 may also be positioned relative to body 30 so that when settling plate 20 is installed in water clarification system 10, stiffening section 31 is in a generally vertical position.

Top flange 28 includes one or more apertures 32 for allowing a clarified liquid to flow through top flange 28. The number and size of aperture 32 varies based on the capacity of the system, anticipated total amount of input liquid, and the rate of flow of liquid into the water clarification system. By adjusting the size and number of the apertures 32, the liquid flow rate through water clarification system 10 may be controlled. Controlling the liquid flow distribution rate in this manner may eliminate the need to control the flow rate using conventional control structures such as weirs or flumes. By positioning apertures 32 in top flange 28, rather than on body 30, the exit channel 34 may be formed with a smooth, flat surface. This configuration substantially prevents suspended solids from accumulating in exit channel 34, thereby reducing maintenance costs for the water clarification system 10.

The size of aperture 32 may vary between about 0.25 inch and 1 inch and preferably between about 9/16 of an inch and about 13/16 of an inch. Apertures 32 may be positioned in any configuration in top flange 28. The size, number, and to some extent, the location of apertures in top flange 28 are a few of the variables that influence the rate of liquid flow through the water clarification system. Apertures 32 may be positioned in top flange 28 closer to the edge of top flange 28 not in contact with body 30 to provide maximum settling action. In one embodiment, top flange 28 includes four apertures 32 positioned approximately equidistant from each other, as shown in FIG. 2.

Figure 5:
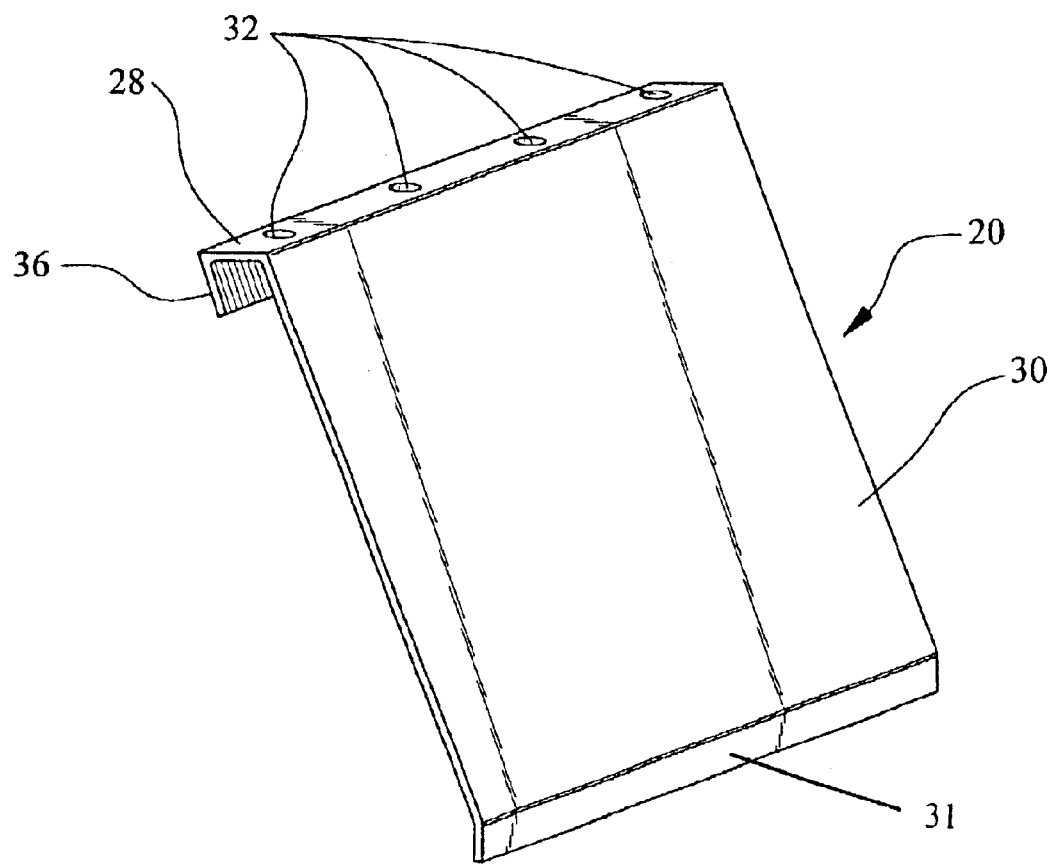
FIG. 5 is a perspective view of a plate of the water clarification system of FIG. 2.

As shown in FIGS. 3 and 5, settling plates 20 may also include a seating member 36 as part of top flange 28 for preventing liquid from passing over settling plate 20 without passing through aperture 32. In one embodiment, sealing member 36 is composed of a thin sheet that is as wide as the body 30 to which the sealing member 36 is attached. Sealing member 36 may be attached to top flange 28 using conventional connection methods such as, but not limited to, welding or by using mechanical connection devices. Sealing member 36 may also be integrally formed from the same sheet of material used to form body 30 and top flange 28 by bending a portion of body 30.

Sealing member 36 seals each settling plate 20 to each adjacent settling plate 20, as shown in FIG. 3, by contacting the adjacent settling plate 20. In one embodiment, sealing member 36 is positioned relative to top flange 28 so that as a first settling plate 20 is installed in housing 12 and guides 22 come to rest in attachment clips 24, sealing member 36 forms an interference fit with the adjacent settling plate 20. Thus, in this embodiment, sealing member 36 is positioned relative to top flange 28 so that sealing member 36 contacts an adjacent settling plate 20 before guide 22 is seated in attachment clip 24. This configuration prevents liquid from leaking between settling plates 20.

Water clarification system 10 may include one or more settling plates 20. In most embodiments, water clarification system 10 includes between 5 and 200 settling plates. The process of installing settling plates 20 in housing 12 may be performed at a manufacturing plant. The assembled water clarification system 10 may then be delivered in a preassembled condition to a site where the system will be used. While not preferred, the water clarification system 10 may be assembled at a site where the system will be used.

Water clarification system 10 may be configured as modules that are capable of being coupled together to position numerous settling plates together. Each module of the water clarification system 10 may include one or more flanges 44 for coupling the modules together. In one embodiment, housing 12 includes two flanges at a first end and two flanges at a second end of housing 12, which is generally opposite from the first end. Water clarification system 10 may use other connection mechanisms for coupling the modules together.

After all of the settling plates 20 have been installed in housing 12, a flange 38 is releasably coupled to a side wall 18 to keep settling plates 20 properly positioned in housing 12 between side walls 18. Flange 38 has an L-shaped cross-section whereby one side of the flange is configured to contact a side wall 18 and the other side of flange 38 is configured to contact the settling plates. The settling plates 20 are sized to fit between first and second side walls 18 that are spaced about four feet from each other; however, this distance may vary. Often times, a space exists between a settling plate 20 and a side wall 18. Flange 38 seals this space and prevents liquid from passing through the water clarification system 10 and into the exit channel 34 without moving between the settling plates 20 and passing through an aperture 32.

Flange 38 may be coupled to side wall using any releasable mechanical connector, such as, but not limited to, bolts, screws, catches, latches, and the like. This configuration allows flange 38 to be removed so that settling plates 20 can be removed for cleaning or replacement, or both. Often times, a portion of the suspended solids that settle out of the liquid collects on the settling plates. The amount of solids on the settling plates 20 often increases to a point where performance is negatively affected. Thus, it is desirable to remove the settling plates from the housing to remove the accumulated solids.

Figure 4:
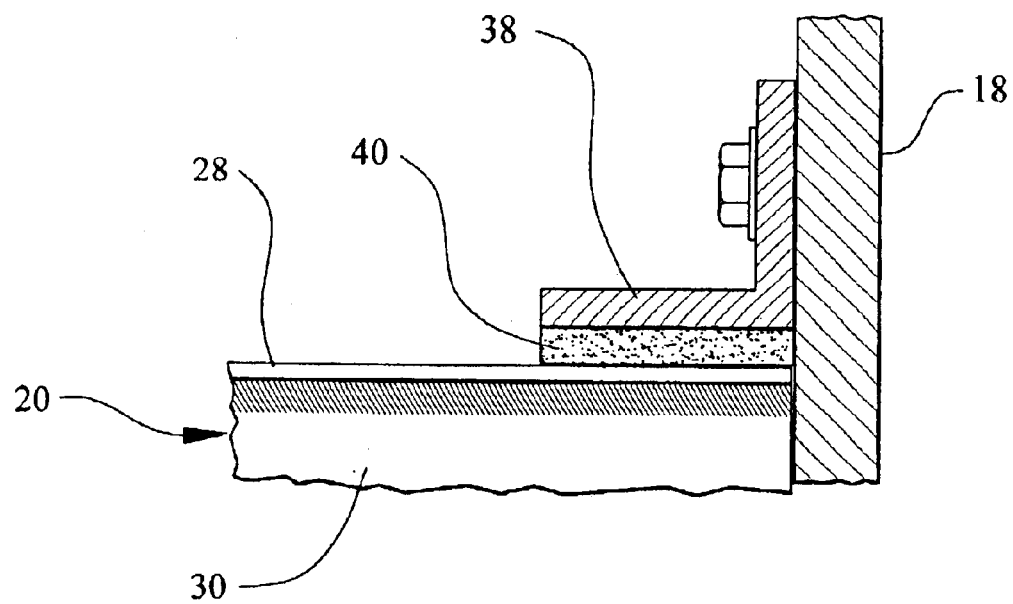
FIG. 4 is a detail of 4—4 shown in FIG. 2.

In one embodiment, as shown in FIG. 4, a flange 38 is coupled to each of the side walls 18. Flange 38 may also include a seat 40 attached to the bottom side of flange 38 for contacting settling plates 20. Preferably, seal 40 covers a substantial portion, if not all, of the bottom side of flange 38. In this position, seal 40 prevents liquid from leaking past top flange 28.

The water clarification system 10 operates to remove suspended solids from liquids using gravity. In operation, water clarification system 10 is positioned in a tank containing liquid to be clarified. The top surface of the liquid should not be higher than side walls 18, but should be higher than the bottom surface of exit channel 34. Liquid flows into inlet orifices 42 that are located in side walls 18 proximate to the bottom of settling plates 20. Inlet channels 42 direct liquid to the lower portions of settling plates 20. As the liquid flows upward between the settling plates 20, suspended solids settle out of the liquid onto the top surface of the settling plates. The solids the migrate down along the top surface of settling plates 20 and eventually fall to the bottom of the tank. Clarified liquid flows through aperture 32 and into exit channel 34. Exit channel 34 directs the clarified liquid from water clarification system 10. During operation of water clarification system 10, solids collected in the tank are removed continuously or at intervals.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A water clarification system, comprising:
    a housing comprising a plurality of side walls and supported by a frame that houses and supports other components of the water clarification system;
    a plurality of guides coupled to the side walls of the housing;
    at least one inlet orifice in the housing for receiving at least one fluid;
    a plurality of settling plates coupled to the guides forming an exit channel above the plurality of settling plates; and
    wherein at least one settling plate comprises a body and a top flange; the top flange comprising at least one aperture and forming a flat bottom surface of the exit channel.

2. The water clarification system of claim 1, wherein at least one settling plate further comprises a sealing member for contacting an adjacent settling plate.

3. The water clarification system of claim 2, wherein the sealing member is coupled to the top flange so that the sealing member forms a seal with an adjacent settling plate.

4. The water clarification system of claim 1, further comprising at least one flange coupled to a side wall and contacting at least one of the plurality of settling plates.

5. The water clarification system of claim 4, wherein the at least one flange is releasably coupled to a side wall.

6. The water clarification system of claim 5, further comprising a seal coupled to a bottom side of the at least one flange so that the seal contacts at least one top flange.

7. The water clarification system of claim 1, further comprising a first flange coupled to a first end of the housing and configured to couple the water clarification system with a second water clarification system.

8. The water clarification system of claim 7, further comprising a second flange coupled to a second end of the housing that is generally opposite to the first end and configured to couple the water clarification system with a third water clarification system.

9. The water clarification system of claim 1, wherein the guides are arranged along the side walls so as to position the plurality of settling plates generally parallel to each other and at an angle that varies between about 30 degrees and about 70 degrees relative to a substantially horizontal line.

10. The water clarification system of claim 9, wherein the settling plates are generally parallel to each other and positioned at angles that vary between about 45 and about 55 degrees relative to a substantially horizontal line.

11. The water clarification system of claim 1, wherein the bodies of the settling plates are generally flat.

12. The water clarification system of claim 1, wherein the at least one inlet orifice is located proximate to a bottom section of the plurality of settling plates.

13. The water clarification system of claim 1, wherein the exit channel is formed by the top flanges of the settling plates and the side walls.

14. The water clarification system of claim 1, wherein a top surface of the top flange is smooth forming a bottom surface of the exit channel.

15. The water clarification system of claim 1, wherein the exit channel is capable of supporting personnel during routine maintenance.

16. The water clarification system of claim 1, wherein at least one of the guides supporting one of the plurality of settling plates seals the settling plate to the side wall, which prevents liquid from bypassing the at least one aperture in the top flange.

17. The water clarification system of claim 1, wherein at least one settling plate includes a stiffening section for stiffening the settling plate.

18. The water clarification system of claim 1, wherein the at least one aperture is sized to control liquid flow distribution through the water clarification system.

19. The water clarification system of claim 1, wherein the plurality of settling plates are individually removable.

20. The water clarification system of claim 1, wherein the plurality of settling plates are capable of supporting personnel.

21. A settling plate, comprising:
a body configured to be installed in a water clarification system at an acute angle relative to a substantially horizontal line; and
a top flange coupled to the body at a top edge of the body and configured to form a flat bottom surface of an exit channel of a water clarification system, wherein the exit channel is capable of being formed above the top flange and wherein the top flange includes at least one aperture for allowing a fluid to flow through the top flange.

22. The settling plate of claim 21, further comprising a sealing member coupled to the top flange for contacting an adjacent settling plate.

23. The settling plate of claim 22, wherein the sealing member extends from the top flange generally parallel to the body.

24. The settling plate of claim 21, wherein the body further comprises a stiffening section for stiffening the settling plate.

25. The settling plate of claim 24, wherein the stiffening section is positioned at an acute angle relative to the body and is substantially vertical when the settling plate is installed in a water clarification system.

26. The settling plate of claim 21, further comprising at least one attachment clip configured to receive a guide in a water clarification system.

27. The settling plate of claim 21, wherein the settling plate is capable of supporting personnel when the settling plate is installed in a water clarification system.

* * * * *